United States Patent [19]

Roth

[11] 4,065,149

[45] Dec. 27, 1977

[54] ANTI-JACKKNIFE APPARATUS

[75] Inventor: Bernard E. Roth, Barrie, Canada

[73] Assignee: Safe Track Manufacturing Limited, Burlington, Canada

[21] Appl. No.: 689,302

[22] Filed: May 24, 1976

Related U.S. Application Data

[63] Continuation-in-part of Ser. No. 626,146, Oct. 28, 1975, abandoned.

[51] Int. Cl.² ........................................... B62D 53/10
[52] U.S. Cl. .................................................. 280/432
[58] Field of Search .................. 280/432, 474, 438 A; 188/106 P

[56] References Cited

U.S. PATENT DOCUMENTS

| | | | |
|---|---|---|---|
| 2,213,221 | 9/1940 | Johnson | 280/432 |
| 3,037,792 | 6/1962 | Colpo | 280/438 A X |
| 3,580,610 | 5/1971 | Warren | 280/432 |
| 3,592,488 | 7/1971 | Holloway | 280/432 |

Primary Examiner—Philip Goodman
Assistant Examiner—R. Schrecengost
Attorney, Agent, or Firm—Rogers, Bereskin & Parr

[57] ABSTRACT

The invention relates to an anti-jackknife apparatus for a tractor-trailer having a fifth wheel on the tractor unit to which the trailer is coupled. The fifth wheel is adapted to permit the trailer to be coupled thereto so that the trailer can turn with respect to the tractor unit when the tractor-trailer is in normal use. Braking means are provided in association with the fifth wheel and are adapted, when operated, to restrict turning of the trailer with respect to the tractor unit in use. Control means for the braking means are provided and are adapted to be operated from the driving cab of the tractor unit whereby, in use, the braking means can be used to arrest or prevent uncontrolled swinging of the trailer with respect to the tractor unit.

5 Claims, 16 Drawing Figures

ANTI-JACKKNIFE APPARATUS

This application is a Continuation-in-part of application Ser. No. 626,146 filed Oct. 28, 1975 and now abandoned.

This invention relates to an anti-jackknife apparatus for a tractor-trailer having a so-called "fifth wheel" on the tractor unit to which the trailer is coupled.

The fifth wheel provides a free pivot about which the trailer can turn relative to the tractor unit, for example, when making turns or when parking. Due to the fact that movement of the trailer about the pivot is unrestricted, however, a trailer may "jackknife" when braking under slipperly road conditions, for example. When this happens, the trailer swings uncontrollably about the pivot provided by the fifth wheel. Frequently, this results in an accident. Also, a trailer may tend to "fishtail" (that is, oscillate about the fifth wheel pivot) on a highway due to cross-winds.

Examples of prior art anti-jackknife devices are disclosed in Canadian Pat. Nos.: 904,373; 815,414; 802,073; 797,701; and 546,504.

An object of the present invention is to provided an improved apparatus which is operable by the driver of a tractor-trailer and which allows him to arrest or prevent uncontrolled swinging of the trailer about the fifth wheel pivot.

According to one aspect of the invention, the apparatus includes a fifth wheel which is adapted to be mounted on the trailer unit and is adapted to permit the trailer to be coupled thereto so that the trailer can turn with respect to the tractor unit when the tractor-trailer is in normal use. Braking means are provided in association with the fifth wheel and are adapted, when operated, to restrict turning of the trailer with respect to the tractor unit in use. Control means for the braking means are provided and are adapted to be operated from the driving cab of the tractor unit whereby, in use the braking means can be used to arrest or prevent uncontrolled swinging of the trailer with respect to the tractor unit.

The invention will be better understood by reference to the accompanying drawings, in which:

FIGS. 7, 8 and 9 are plan views of different fifth wheel construction according to three alternative embodiments of the invention; FIGS. 8 and 9 being on a somewhat smaller scale than FIG. 7;

Figures 1, 2:
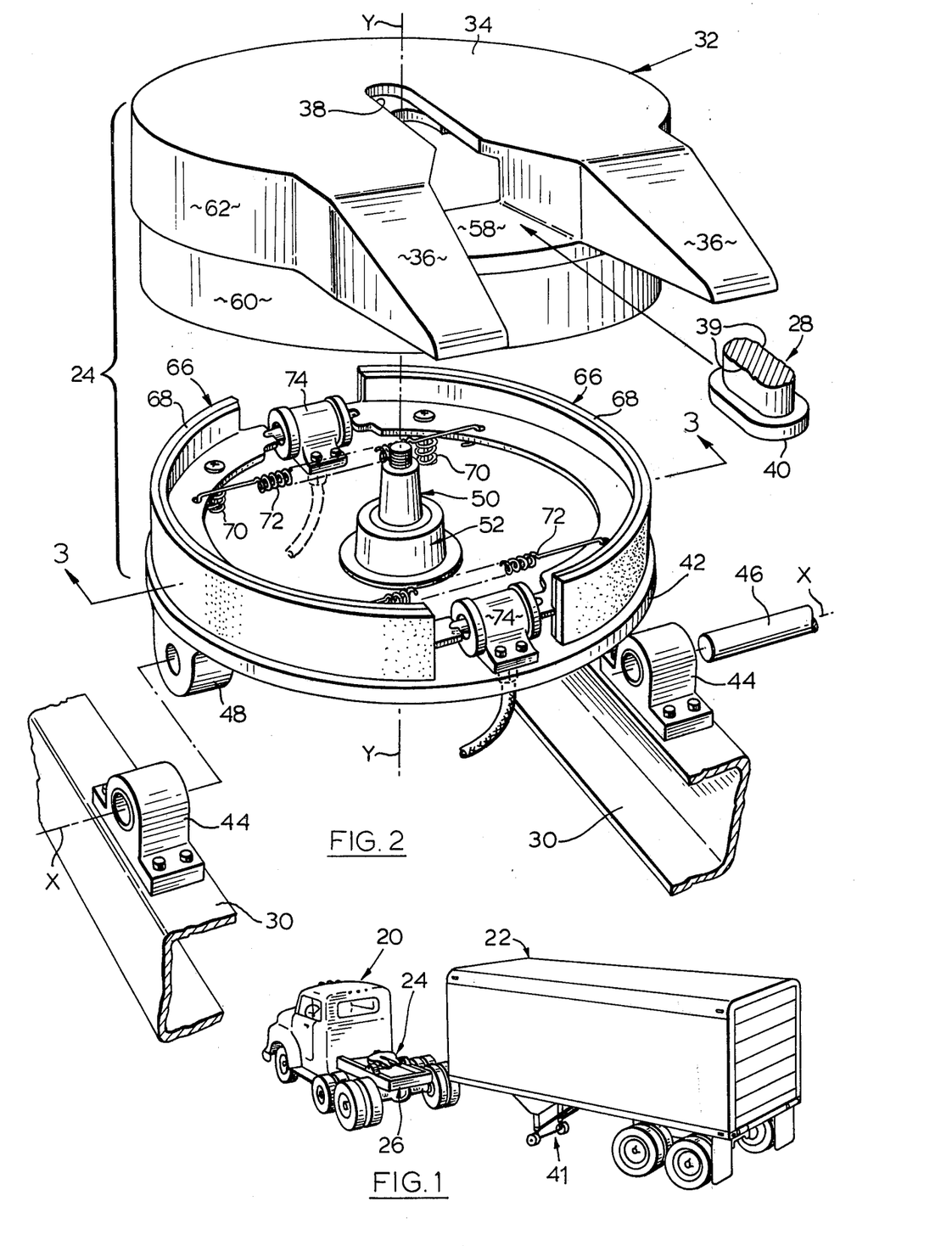
FIG. 1 is a perspective view of a tractor-trailer having an anti-jackknife apparatus according to the invention, the trailer being shown uncoupled from the tractor unit.
FIG. 2 is an exploded perspective view of the fifth wheel coupling of the tractor unit.

Reference will first be made to FIG. 1 which shows a tractor-trailer including a tractor unit 20 and a trailer 22. A fifth wheel coupling 24 is provided on the frame 26 of the trailer unit. As is conventional, the trailer 22 has at its forward end a depending coupling pin which is releasably connected to the fifth wheel coupling 24 and by which the trailer 22 is connected to the tractor unit 20. The coupling pin is not visible in FIG. 1 but is shown separate from the trailer at 28 in FIG. 2.

In FIG. 2, two parallel outer channel members of the frame 26 of the tractor unit 20 are visible at 30. The fifth wheel coupling 24 is mounted between these members 30. The coupling includes a fifth wheel 32 which is of plate form and which includes a part circular portion 34 and a pair of projections 36 having upper surfaces which slope downwardly from the portion 34. The projections 36 are spaced from one another to define an entrance to a slot 38 formed in the part circular portion 34. As can be seen, the slot 38 is disposed on a line which extends diametrically with respect to the part circular portion 34 and which is disposed mid-way between the two projections 36. The pin 28 is formed with a pair of flats 39 and the slot is dimensioned to snugly receive the coupling pin 28 so that the pin (and hence the trailer) is coupled to the fifth wheel and cannot turn relatively thereto. A flange 40 extends around the lower end of the pin 28 and is disposed below the part circular portion 34 of the fifth wheel when the pin is fully engaged in the slot 38. A locking mechanism, part of which is visible in FIG. 2 below the slot 38 is provided to retain the pin 28 in its fully engaged position in the slot and will be described later with reference to FIGS. 3 and 5.

The construction of the fifth wheel 32 as so far described is generally conventional. Assuming the tractor unit and trailer are initially separate with the trailer parked on stands 41 (FIG. 1), they are coupled together by backing the tractor unit up to the trailer so that the pin enters the space between the two projections 36 on the fifth wheel. Continued movement of the tractor unit towards the trailer causes the pin to enter the slot 38 and move back to the fully engaged position. The sloping upper surfaces of the projections 36 serve to lift the trailer slightly off its stands as the pin 28 enters the slot 38, the undersurface of the trailer sliding up the said surfaces of the projections. Engagement of the pin 28 with the fifth wheel is further assisted by the fact that the fifth wheel coupling 24 is pivotable about a horizontal axis which is denoted X-X in FIG. 2 and which is disposed at right angles with respect to the channel members 30 of the tractor unit frame. Due to the projections 36, the balance of the fifth wheel is such that it tends to naturally tip downwardly at its outer end (the end having the projection 36) so that the projections will always pass below the trailer as the tractor unit is backed up.

Figure 3:
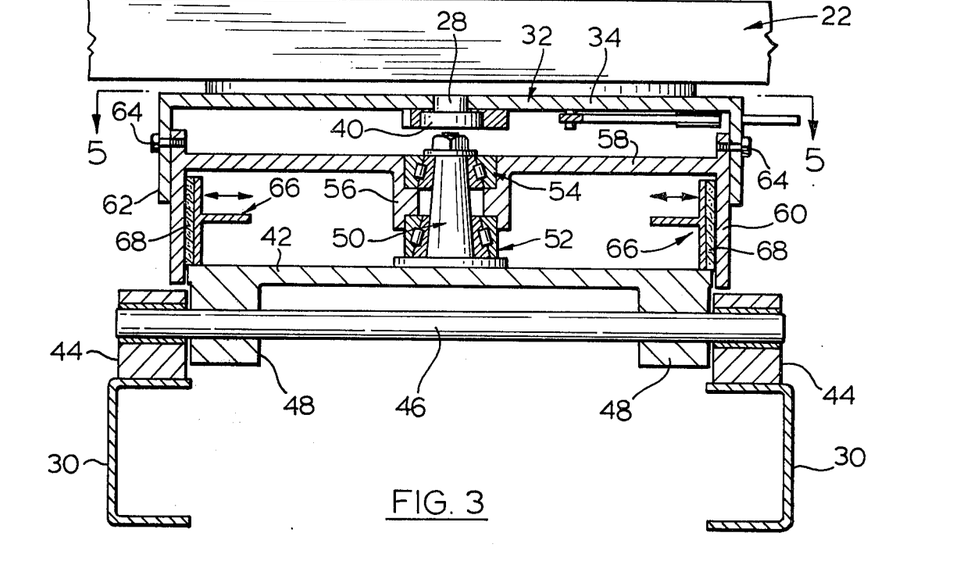
FIG. 3 is a vertical sectional view on line 3—3 of FIG. 2, the coupling being shown in the assembled condition.

The fifth wheel 32 is supported on the members 30 through the intermediary of a circular base plate 42. A pair of bearing blocks are bolted to the upper flanges of the channel members 30 in transversely aligned positions and are adapted to turnably receive a pivot shaft 46 which is frictionally engaged in a corresponding pair of apertured formations 48 which depend from the underside of plate 42. The fifth wheel 32 is also turnably mounted on the base plate 42 by way of a tapered shaft 50 which projects upwardly from the centre of plate 42. The axis of turning is denoted Y-Y. The inner races of a pair of roller bearings 52, 54 are fitted to the shaft 50 (see FIG. 3) and the outer races of the bearings are carried in a housing 56 which is coupled to the fifth wheel 32 as will be described. Housing 56 is disposed at the centre of a circular plate 58 positioned below and parallel to the part circular portion 34 of the fifth wheel. A cylindrical member 60 extends around the periphery of plate 58 and its lower margin surrounds the outer edge of the base plate 42, as can be seen from FIG. 3. The part circular portion 34 of the fifth wheel 32 has a depending skirt 62 which is coupled to the upper margin of the cylindrical member 60 by bolts 64 (FIG. 3).

Mounted on the upper surface of plate 42 are a pair of brake shoes 66 which are curved to conform to the curvature of the inner surface of the cylindrical member 60 described above. It will be appreciated that this member and the plate 58 in effect define a brake drum, on the inner surface of which the brake shoes 66 act. Each shoe 66 includes an outer layer 68 of a friction material which makes contact with the inner surface of the cylindrical member 60. The brake shoes 66 are coupled to the base plate 42 by coil springs 70 as is conventional in vehicle brakes and are drawn together by a pair of tension springs 72. A pair of double acting actuators 74 are fitted to the base plate 42 between the ends of the respective brake shoes 66 and are adapted to be operated to move the shoes 66 outwardly into frictional engagement with the inner surface of the member 60. The method of operating the actuators 74 will be described later in relation to FIG. 6. It is sufficient to note here that the actuators can be progressively operated from the cab of the tractor unit of the tractor-trailer combination to apply any appropriate degree of braking effort to the inner surface of the member 60 and hence to the fifth wheel. Accordingly, when the trailer 22 is coupled to the tractor unit 20, a braking effort can be applied to the fifth wheel to either lock the trailer with respect to the tractor unit or to provide any required degree of restraint on turning movement of the trailer with respect to the tractor unit.

Figure 4:
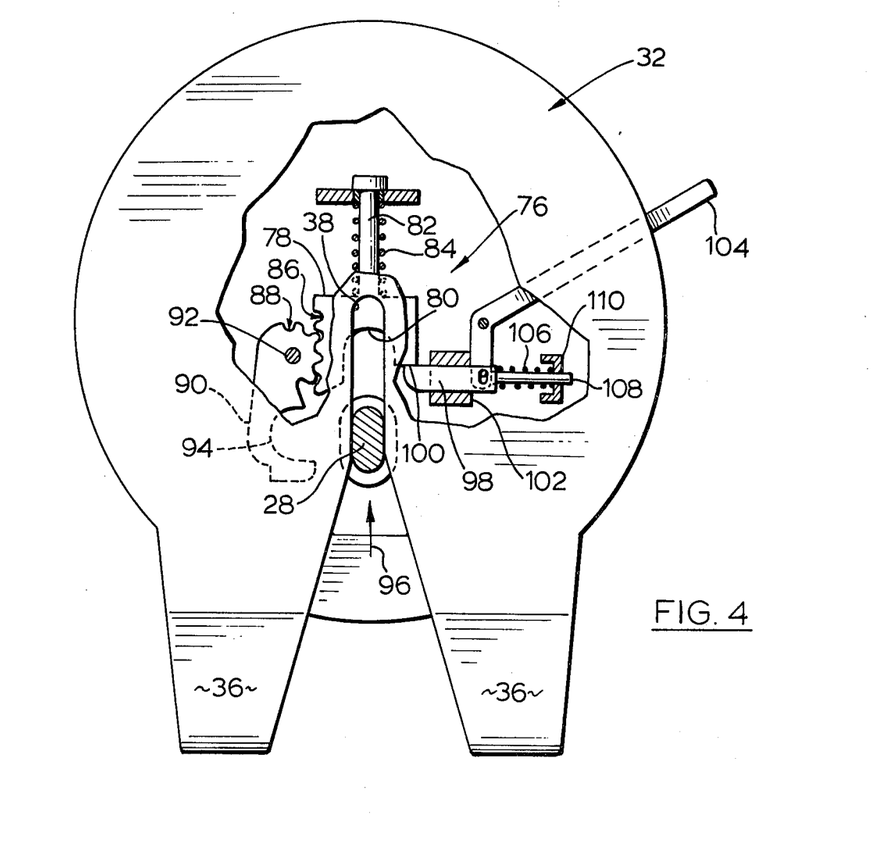
FIG. 4 is a plan view of the fifth wheel, partly broken away to show the mechanism for locking the trailer coupling pin to the fifth wheel, the pin being shown in a position prior to full engagement with the fifth wheel.
Figure 5:
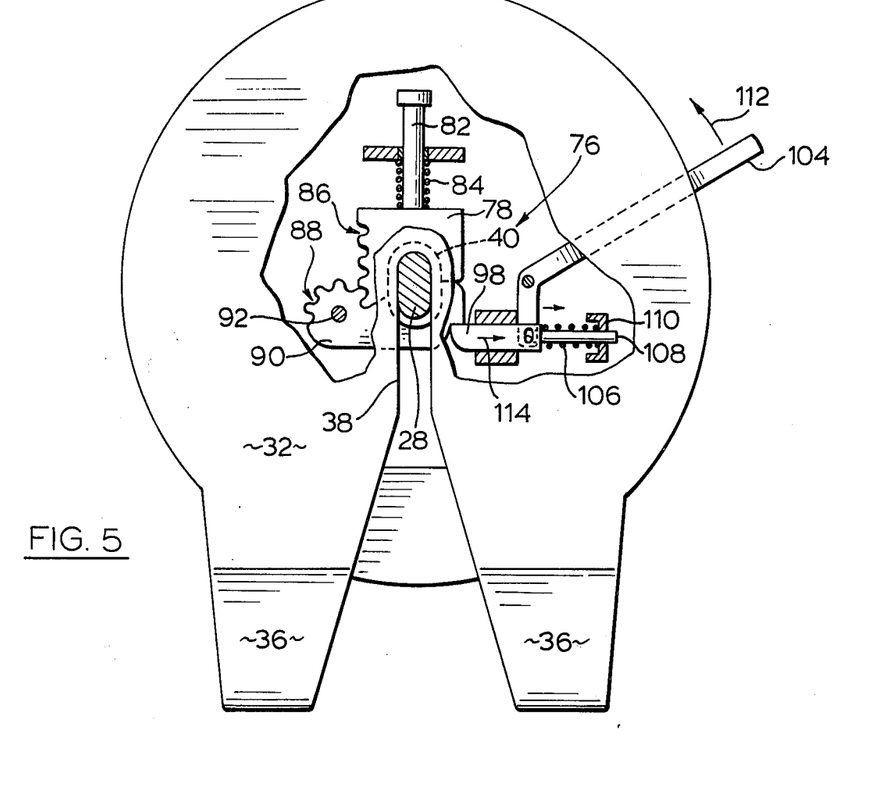
FIG. 5 is a view similar to FIG. 4 showing the coupling pin fully engaged with the fifth wheel.

Referring now to FIGS. 4 and 5, the locking mechanism for retaining the coupling pin 28 on the trailer in the slots 38 in the fifth wheel is generally denoted 76 and is mounted on the underside of the part circular portion 34 of the fifth wheel 32. The mechanism includes a first element 78 against which the coupling pin 28 abuts as it moves towards the end of slot 38 and which is formed with a recess 80 to receive the flange 40 on the coupling pin 28. Element 78 is carried by a short rod 82 fitted with a compression spring 84 which biasses the element 78 towards the open end of slot 38. A rack 86 is formed in one side of element 78 and is engaged by complementary teeth 88 forming a pinion section on a second element 90 which is pivoted to the underside of the fifth wheel at 92. Due to the rack and pinion connection between element 78 and element 90, the latter is automatically turned about its pivot 92 to engage behind the flange 40 on the pin 28 as the pin moves to its end position in slot 38. FIG. 4 shows the positions of the locking elements as pin 28 begins to move along the slot 38 in the direction of arrow 96 as the tractor unit of the tractor-trailer is backed up to the trailer. FIG. 5 shows the positions of the elements 78 and 90 when element 90 has engaged behind the pin 28. Element 90 is held in this position by a stop 98 which engages behind a shoulder 100 on element 90. The stop 98 is slidably mounted in an aperture in a support block 102 secured to the underside of the fifth wheel. The inner end of element 98 is coupled to a bellcrank lever 104 which projects beyond the periphery of the fifth wheel. Element 98 is biassed into the locking position in which it is shown in FIG. 5 by a compression spring 106 mounted on a pin 108 coupled to element 98. Spring 106 acts between the rear end of element 98 and a stop 110 on the underside of the fifth wheel.

The locking mechanism 76 can be released when the trailer 22 is to be uncoupled from the tractor unit 20 by moving lever 104 in the direction of arrow 112 in FIG. 5, which causes the stop element 98 to withdraw in the direction of arrow 114. If the tractor unit is then driven away from the trailer, pin 28 will tend to move out of slot 38 and will cause lock element 90 to return to the position in which it is shown in FIG. 4.

Figure 6:
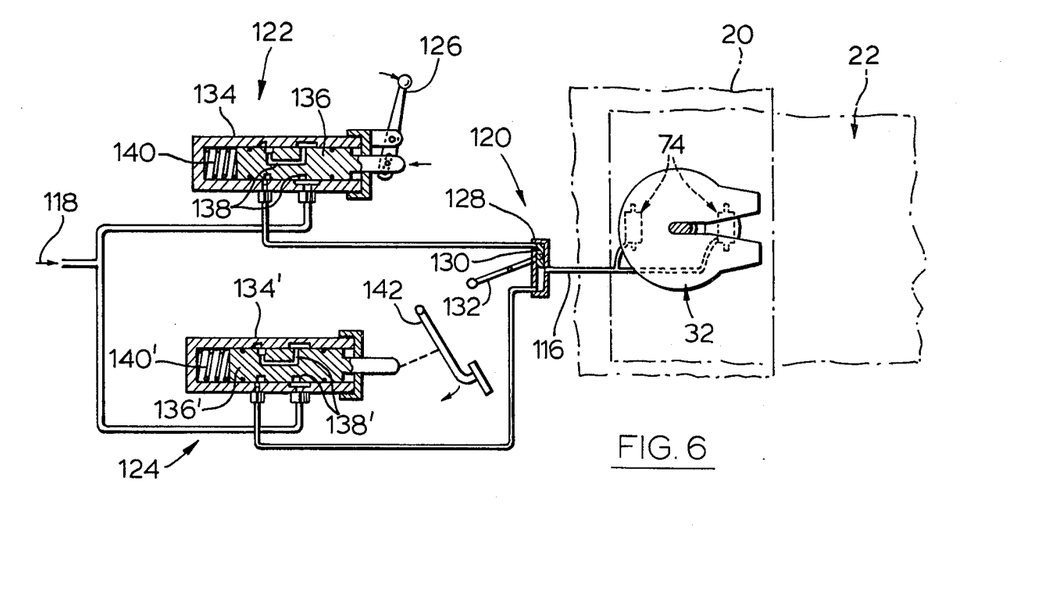
FIG. 6 is a diagrammatic illustration of the control for the anti-jackknife apparatus.

Reference will now be made to FIG. 6 in describing how the braking means incorporated in the fifth wheel coupling is operated. The trailer is indicated diagrammatically at 22 in FIG. 6 and the tractor unit at 20. The actuators 74 are pneumatically operated and are coupled to a common supply line 116 which is connectible by way of a number of valves (to be described) with the pneumatic supply conventionally provided on such tractor units. The supply is indicated at 118. The first of these valves is a selector valve 120 which is connected in line 116 and is operable to connect the actuators 74 selectively to one of two spool valves 122 and 124. Valve 122 is a manually operable valve having an operating lever 126 which can be moved by the driver of the tractor unit to vary the pressure of the air supplied to the actuators 74 from the supply 118 to control the force with which the fifth wheel brake is applied. The other valve 124 is coupled with the brake pedal of the tractor unit parallel with the conventional master cylinder so that valve 124 is operated when the brake is applied and varies the pressure of the air supplied to the actuators 74 in accordance with effort applied to the brake pedal.

Valve 120 is a conventional two-position spool valve having a body 128 in which a spool 130 is movable by an operating lever 132 between the position in which it is shown in FIG. 6, in which the actuators 74 are connected to valve 124, and the position indicated in ghost outline in which the actuators are connected to valve 122. Latching means (not shown) are provided to latch the lever in either of its two positions. Valve 120 will be operated by the driver of the tractor unit, depending on whether he wishes the fifth wheel brake to be operated automatically in accordance with the braking effort applied by the brake pedal of whether he wishes to control the braking effect manually by means of lever 126.

Valve 122 includes a body 134 and a spool 136 formed with air passageways 138. Spool 136 is biassed to one end of the body 134 by a spring 140 and is coupled to the operating lever 126. Lever 126 may, for example, be mounted on the steering column of the tractor unit so as to be readily accessible to the driver. Latching means (not shown) are also provided in association with lever 120 so that the driver can secure the lever in the "fully on" position if necessary. Valve 124 is similar to valve 122 and primed reference numerals have been used in referring to valve 124, to denote parts which are similar to parts of valve 122. The spool 136' of valve 124 is coupled to the brake pedal 142 of the tractor unit by a mechanical linkage indicated diagrammatically in FIG. 6.

In use, the driver of the tractor unit moves valve 120 to whichever of its two positions he considers most appropriate. For example, if the valve is in the position in which it is shown, braking force will be applied to the fifth wheel whenever he operates the foot brake of the tractor unit. Accordingly, when negotiating a curve, for example, the driver may apply the tractor brakes and this will both slow the tractor-trailer and will apply a restraint to the fifth wheel pivot. Alternatively, if the driver moves the valve 120 to the other position, he can control the fifth wheel brake completely independently of the tractor-trailer brakes. For example, he might consider it desirable to apply a fairly light restraining force to the fifth wheel pivot to prevent the trailer "fish-trailing" (that is, swinging from side to side) on a highway. In another situation, the driver might consider it advisable to completely lock the fifth wheel pivot by moving the lever 126 to its "fully on" position and locking it in that position.

Figure 7:
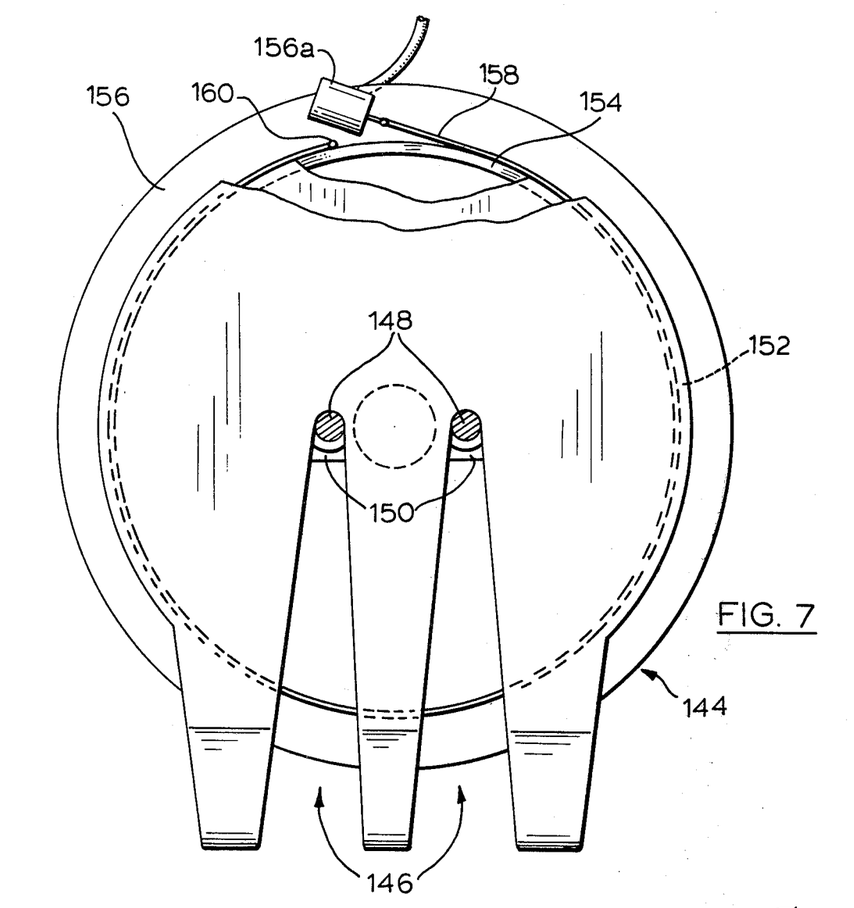
Figure 8:
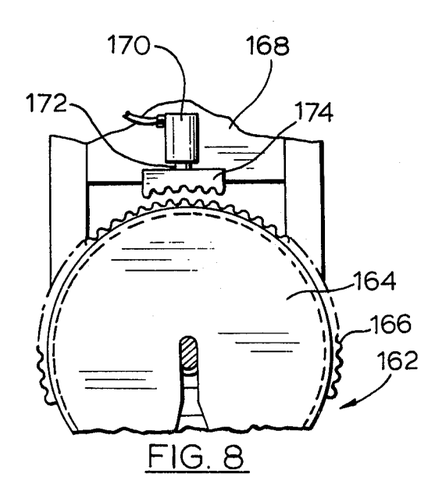
Figure 9:
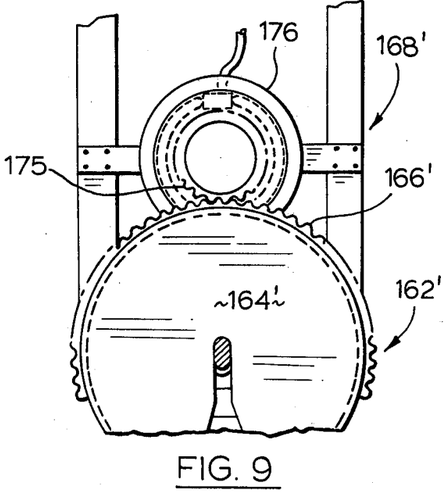

Reference will now be made to FIGS. 7, 8 and 9 in describing alternative embodiments of the invention.

Referring first to FIG. 7, the fifth wheel is generally denoted 144 in this view and differs from that shown in the previous embodiment in that it is formed with two slots 146. Similarly, the trailer is modified by the provision of two depending coupling pins 148 positioned to be received in the said slots. An appropriate locking element indicated diagrammatically at 150 is provided in association with each slot to retain the relevant pin therein. In this case, the pins are both of circular shape in cross-section. Flats on the pins are not necessary since the provision of two pins makes it impossible for the trailer to turn with respect to the fifth wheel. Further, the provision of two coupling pins halves the load on each pin compared with the previous embodiment and accordingly reduces the risk of failure of the coupling between the tractor unit and the trailer.

The embodiment of FIG. 7 also differs from the previously described embodiment in that an external band brake is used in association with the fifth wheel in place of the expanding shoe type of brake shown in FIG. 2. As in the FIG. 2 embodiment, the fifth wheel 144 has a depending skirt 152 which is bolted to a cylindrical member 154 similar to member 60 in FIGS. 2 and 3, which forms a brake drum. A base plate 156 is pivotally coupled to the frame of the tractor unit and carries bearings which allow the fifth wheel to turn as in the previous embodiment. Base plate 156 also carries single-acting pneumatic actuactor 156 which is connected to one end of a metal band 158. The band extends around the exterior surface of member 154 and its opposite end is anchored at 160 to the base plate 154. Actuator 156 is coupled to the pneumatic supply of the tractor unit as in the previous embodiment so that air can be supplied to the actuactor to tighten the band 158 and restrain the fifth wheel against turning movement.

Reference will now be made to FIG. 8 which shows a further alternative embodiment of the invention. In this embodiment, the fifth wheel is indicated at 162 and includes the part circular portion 164 which has a series of teeth 166 around its periphery. The frame of the tractor unit is indicated at 168 and carries a pneumatic actuator 170 which is coupled to the pneumatic circuit of the tractor. The actuator includes an operating rod 172 which carries at its outer end a segment 174 provided with teeth complementary to those around the periphery of the fifth wheel. The fifth wheel is mounted in bearings which allow it to turn in the same fashion as the previously described embodiments.

Operation of the actuactor 170 causes the segment 174 to be projected towards the fifth wheel so that the teeth on the segment engage in appropriate section of the teeth on the fifth wheel to lock the fifth wheel in the angular position in which it is disposed at that time. It will be appreciated that this form of braking means does not allow for slip. Accordingly, the actuator 170 may be coupled to a simple on/off valve in the pneumatic supply line. The valve may be operated manually by the driver of the tractor unit.

FIG. 9 illustrates a further embodiment which is a modification of that shown in FIG. 8. In this case, the fifth wheel is of similar form to that shown in the previous embodiment in that it is provided with teeth around its periphery. Primed reference numerals have been used in FIG. 9 to denote parts which are similar to those shown in FIG. 8. In this embodiment the teeth 166' on the fifth wheel 162' mesh with a pinion 165 which is mounted in bearings on the frame 168' of the tractor unit. Accordingly, the pinion 175 turns in response to turning of the fifth wheel 162'. A brake drum 176 is mounted on the under side of pinion 175 to turn therewith and is provided with an internal expanding shoe brake mechanism similar to that shown in FIGS. 2 and 3. The brake mechanism is coupled to the pneumatic supply of the vehicle as in the first embodiment. The brake shoes are mounted on a back plate which is rigidly fixed to the frame 168' of the tractor unit. Accordingly, operation of the brake restrains the pinion 175 and hence the fifth wheel 162' against turning movement. In this embodiment the fifth wheel is not pivotable with respect to the frame of the tractor unit.

Figure 10:
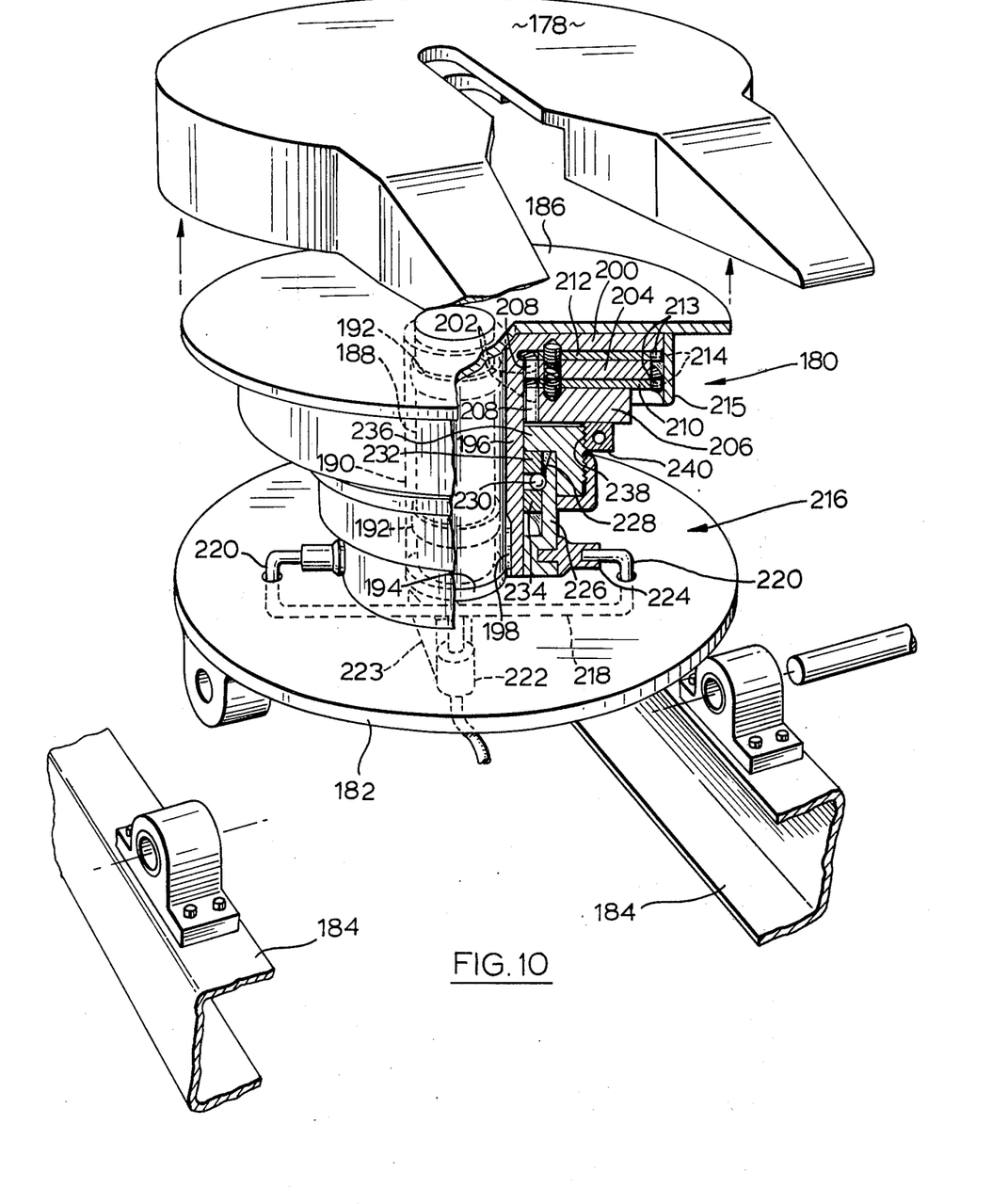
FIGS. 10 and 11 are exploded perspective views similar to FIG. 2 illustrating two further embodiments of the invention.

Reference will now be made to FIG. 10 which illustrates an embodiment of the invention in which the braking means associated with the fifth wheel takes the form of a clutch assembly. The fifth wheel is denoted 178 and is of similar form to the fifth wheel shown in FIG. 2. The clutch assembly is generally denoted 180 and is positioned between the fifth wheel 178 and a base plate 182 which is coupled to the frame 184 of the tractor unit in similar fashion to the base plate 42 in FIG. 2. Parts of the FIG. 10 embodiment which are similar to parts of FIG. 2 will not be described in detail since their construction will be evident from the above description.

A circular plate 186 is attached to the bottom of the fifth wheel (in FIG. 10 the plate is shown spaced below the fifth wheel for clarity of illustration). Plate 186 is carried by a vertical, rotatable shaft indicated in dotted lines at 188. The shaft is supported for rotation in an outer sleeve 190 fixed to the base plate 182 by way of bronze bushes 192. A ball bearing race generally indicated at 194 is provided at the lower end of shaft 188 to support the weight of the fifth wheel.

The clutch assembly 180 includes a sleeve form hub 196 which fits around the sleeve 190 and is coupled thereto by a key 198. Hub 196 has an integral upper flange 200 of circular shape and if formed at a position just below the flange with an annular series 202 of vertical ribs which extend around the hub and, in effect, form a series of teeth. Two annular metal clutch plates 204, 206 are positioned around the teeth 202 and the centre aperture of each plate is formed with a series of inwardly directed teeth which engage with the teeth 202. Accordingly, the plates 204, 206 are vertically slidable with respect to the hub 196 but are drivably coupled thereto by the said teeth. A free floating annular plate 210 of a friction material is positioned between the two clutch plates 204, 206. A similar plate 212 is positioned between the upper clutch plate 204 and the flange 200 of the hub 196. Each of these plates is provided with a peripheral series of vertical ribs 213 similar to the ribs on the clutch plates 204, 206 which in effect define teeth around the periphery of each plate. These teeth engage with a series of complementary teeth 214 on the inner surface of an annular drum member 215 which depends from the plate 186. Accordingly, the friction plates 210, 212 turn with respect to the clutch plates 204, 206 as the fifth wheel and hence the drum member 215 turn. In this condition, the clutch is "off" and the fifth wheel 178 is free to turn with the trailer to which it is coupled. To move the clutch to the "on" position, the lower clutch plate 206 is moved upwardly, sliding on the ribs 202 carried by the hub 196. As it moves up, plate 206 pushes the lower friction plate 210 against the upper clutch plate 204. This plate in turn urges the upper friction plate 212 against the upper flange 200 of the drive hub. In other words, the "sandwich" of clutch plates and friction plates are compressed, frictionally coupling the turnable fifth wheel with the stationary centre sleeve 190. The force applied to the lower clutch plate can be controlled to allow a degree of slip between the friction plates and the clutch plates, or the plates can be clamped firmly together to in effect lock the fifth wheel.

Movement of the clutch plates is effected by an operating assembly generally denoted 216 and including an operating fork 218 which is disposed in a vertical plane below the base plate 182 and which includes two arms 220 arranged to project upwardly through apertures in the base plate. The fork is coupled to an actuator unit 222 attached to the underside of plate 182 by a bracket 223 and coupled to the hydraulic system of the tractor unit in the same fashion as the actuactors described in the preceding embodiments. The arms 220 are coupled by a collar 224 to a sleeve 226 which is mounted concentrically with respect to the sleeve 190. Sleeve 226 is vertically slidable with respect to the sleeve 190 and is provided with a tapered inner surface 228. This surface bears against a series of balls 230 mounted in races 232, 234 which are slidably fitted around the drive hub 196. The balls 230 are slidable radially with respect to the drive hub 196. The upper race 232 bears against a flanged collar 236 which has an external screw thread 238. An adjusting ring 240 is screwed onto thread 236 and has an upper face which bears against the lower clutch plate 206.

Accordingly, when the actuactor 222 is operated, the fork 218 moves the sleeve 226 upwardly. By virtue of its tapered inner surface 228, the sleeve 226 engages the balls 230 and moves them upwardly. In turn, this movement displaces the upper race 232 and the collar 233. The adjusting ring 240 carried by the collar bears against the clutch plate 206 to urge the clutch plates and friction discs together as described previously. When the hydraulic fluid pressure applied to the actuactor 222 is reduced, the force urging the said plates together reduces and the plates can move down.

Figure 11:
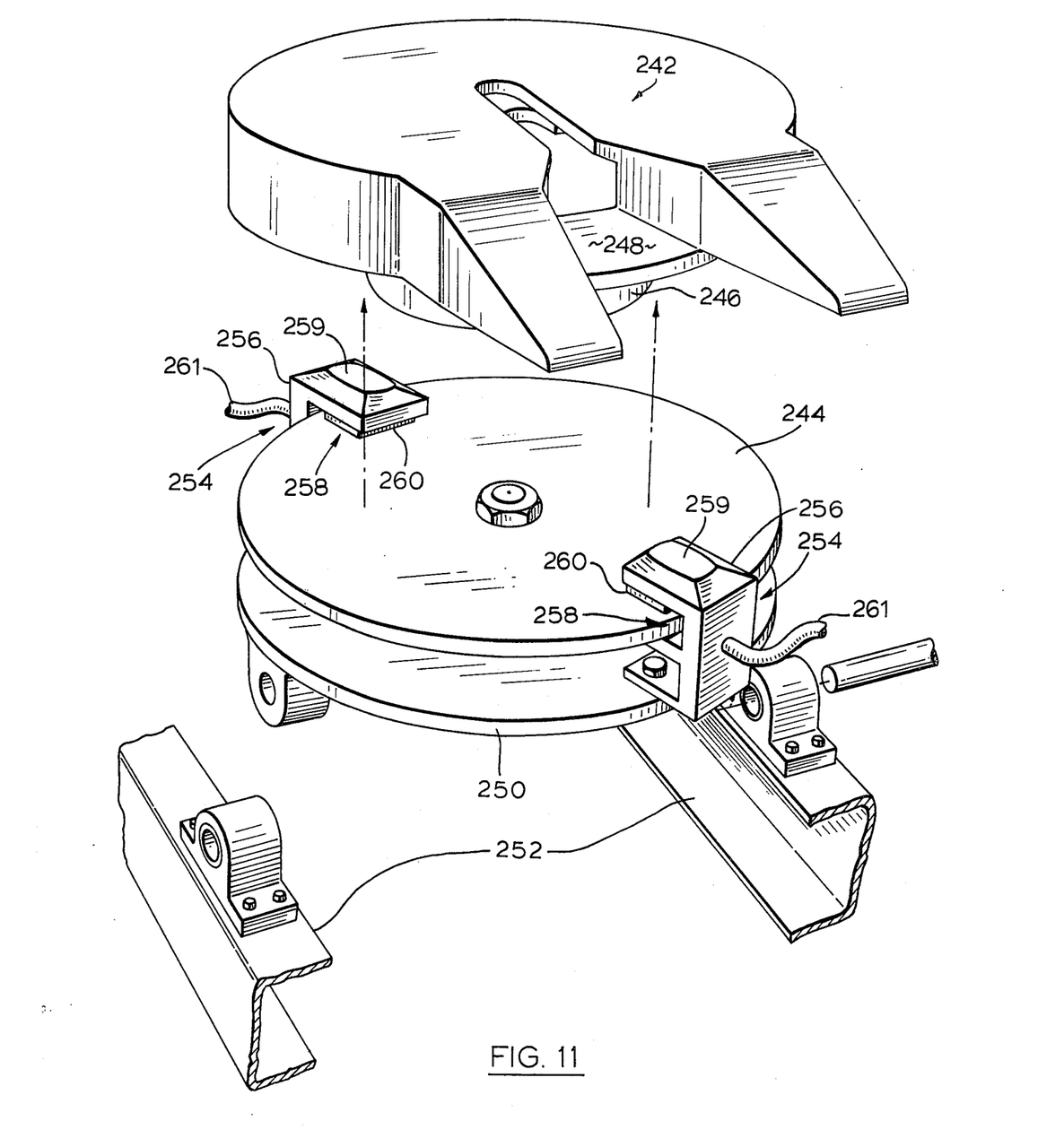

FIG. 11 illustrates a further embodiment of the invention in which a disc brake assembly is fitted to the underside of a fifth wheel. The fifth wheel is generally denoted 242 and is of similar form to the fifth wheel shown in FIG. 2; it will not therefore be described in detail. A disc 244 is fixed to the underside of the fifth wheel assembly by an annular member 246 which is attached to a plate 248 at the underside of the fifth wheel and also to the disc 244. For clarity of illustration, disc 244 is shown spaced below the fifth wheel in FIG. 11. A base plate 250 is provided as in FIG. 2 and is coupled to the frame 252 of the tractor unit, as in the FIG. 2 embodiment. Also as in that embodiment the base plate carries an upstanding tapered shaft (not visible) which fits into a housing at the underside of disc 244. Bearing races are provided in the housing to allow the disc and fifth wheel to turn together with respect to the base plate when the fifth wheel coupling is in the assembled condition.

The base plate 250 carried two brake caliper assemblies 254 positioned at diametrically opposed positions. The calipers are basically of the same construction as disc brake calipers used in vehicle braking systems. Each caliper includes a housing 256 which is shaped to define a slot 258 through which the disc passes. Each caliper housing 256 is shaped to define two hydraulic cylinders, positioned one above and one below the disc. The bases of the upper cylinders are visible at 259 in FIG. 11. Each of these cylinders receives a piston, not visible, which is movable towards the disc by hydraulic fluid supplied to the caliper under pressure. Each piston bears on a disc pad 260 of a friction material which lies in surface contact with the relevant face of the disc 244. The calipers 256 are coupled to the hydraulic system of the tractor unit by pipes 261 as described in the first embodiment, whereby fluid pressure can be applied to the calipers to urge the disc pads against the discs to apply a restraining force tending to opposed turning of the disc or to lock the disc against rotation.

Figure 12:
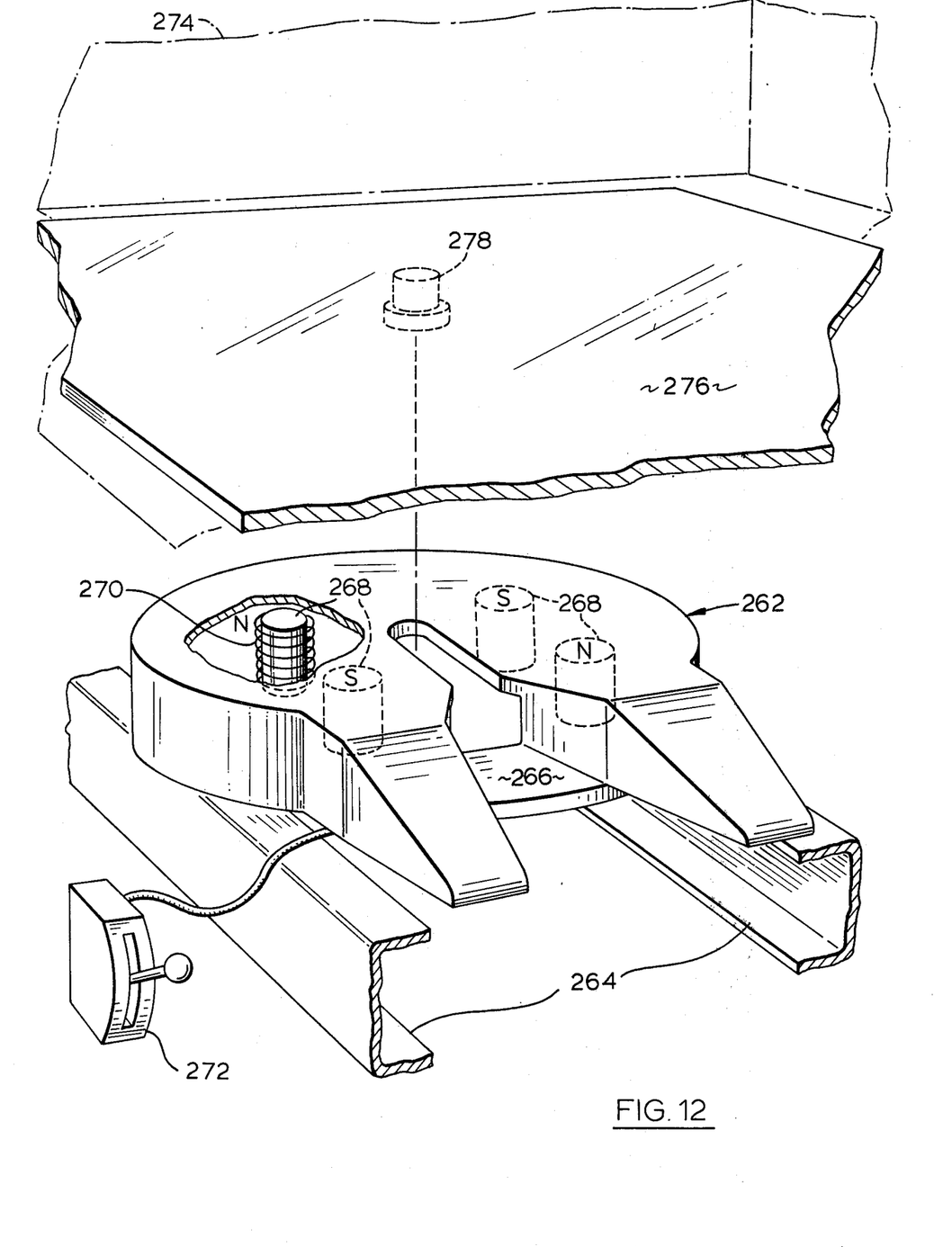
FIG. 12 is a perspective view of a fifth wheel according to another embodiment; and, FIG. 13 is a perspective view of an adaptor block for fitment to a coupling pin on a conventional trailer.

Referring finally to FIG. 12, a fifth wheel similar to that shown in FIG. 2 is generally denoted 262 and is fixed rigidly to the frame 264 of a tractor unit. The fifth wheel 262 has a base plate 266 which carries four electromagnets 268 arranged with their axes vertical. The core of each magnet is surrounded by a coil 270 (only one of which is shown) and the coils are coupled to a generator driven from the engine of the tractor unit. The coils are arranged so that, when energized, two north poles and two south poles are produced as indicated. An infinitely variable voltage control 272 is connected in the electrical supply to the coils 270 so that the magnetic field intensity produced by the electromagnets 268 can be varied. The voltage control 272 is positioned in the cab of the tractor unit.

In FIG. 12, part of the leading end of the trailer is indicated in ghost outline at 274. A plate 276 of a magnetic material is secured to the underside of the leading end of the trailer and is fitted with a depending coupling pin 278 of conventional form having a circular cross-section. When the coupling pin 278 is received in a slot in the fifth wheel, the plate 276 overlies the upper surface of the fifth wheel. If the voltage control 272 is operated to energize the electromagnets 268, 270, the plate 276 is drawn down onto the upper surface of the fifth wheel and magnetically retained thereon. By varying the magnetic field intensity produced by the electromagnets 268, the force with which the plate 276 is drawn down onto the fifth wheel can be adjusted to apply an appropriate degree of restraint to turning of the trailer with respect to the tractor unit. For example, if the control is operated to produce maximum field intensity, the plate 276 will be locked to the fifth wheel so that the trailer 274 will be unable to turn with respect to the tractor unit. If the field intensity is reduced by appropriate operation of the control unit 272, the retaining force will be correspondingly reduced and the trailer will be able to turn against a restraining force.

In a modification of the embodiment according to FIG. 12, the fifth wheel 262 may be mounted to turn with respect to the frame 264 of the tractor unit as in the FIG. 2 embodiment. The electromagnets 268 would then be mounted on a base plate carried by the tractor unit and would be arranged to act either directly on the underside of the fifth wheel itself or on a plate of a magnetic material mounted below the fifth wheel. In this case, the coupling pin on the trailer will be provided with flats so that the trailer and fifth wheel cannot turn with respect to one another.

Figure 13:
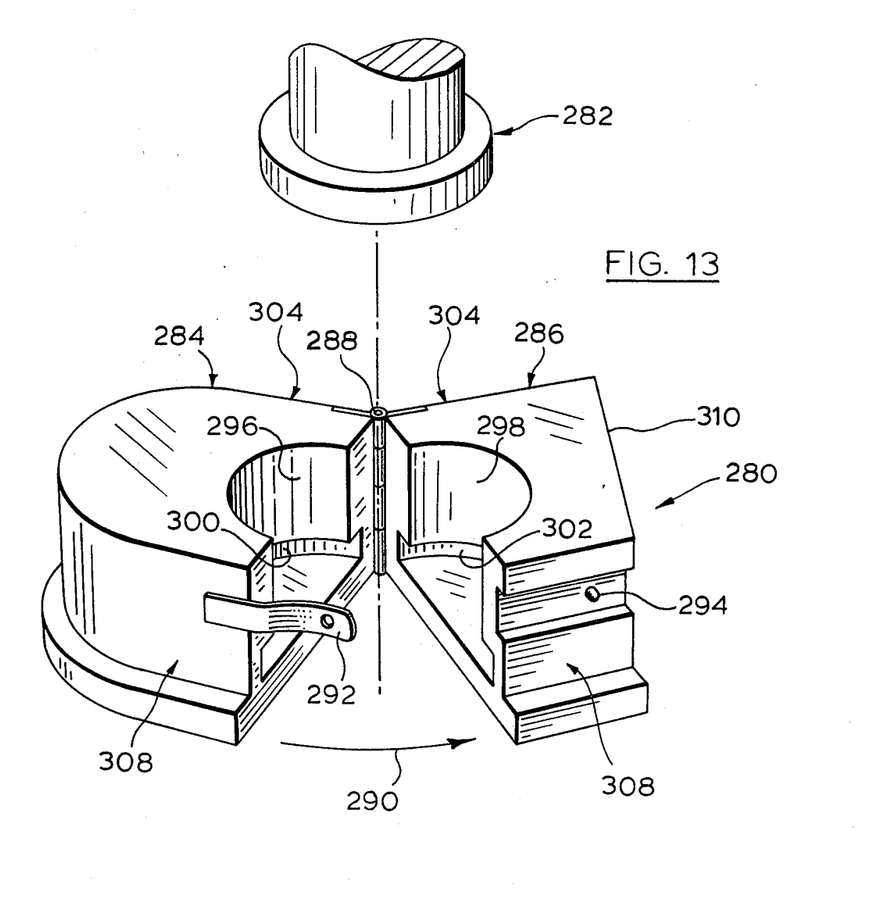

FIG. 13 shows a coupling block 280 which can be fitted to a conventional round coupling pin 282 to in effect provide flats on the pin intended to be received in a slotted fifth wheel of a tractor unit having an antijackknife apparatus according to the invention. It is to be noted that the coupling block of FIG. 13 simply allows such a trailer to be coupled to the tractor but would not allow the anti-jackknife apparatus to be used since the coupling block will be freely turnable on the coupling pin.

As can be seen from FIG. 13, the block is made in two halves 284, 286 which are coupled together by a hinge 288. The hinge allows the two halves of the coupling block to be moved between open positions such as those shown in the drawing, and positions in which the two halves are closed together as indicated by arrow 290. The halves are retained in the closed position by a spring member 292 on one half which engages over a pin 294 on the other half.

The two halves 284, 286 are formed with opposing recesses 296, 298 which are shaped so that, when the halves 284, 286 are in the closed position, the recesses together define an opening complimentary to the shape of the coupling pin 282. Each recess 296, 298 has a lower portion 300, 302 which receives part of the bottom flange of coupling pin 282. Accordingly, the two halves of the coupling block can be closed around the coupling pin 282. The portions 300, 302 of the respective recesses 296, 298 prevent the coupling block being accidently pulled off the pin 282. The only way the block can be removed is by releasing the spring element 292 and hinging apart the two halves 284, 286 of the block.

The halves of the block are shaped so that when they are in the closed position, parallel flats 304, 308 are defined at respectively opposite sides of the block. These flats are arranged to fit closely into the slot in the relevant fifth wheel when the trailer to which the block is fitted is to be coupled to a tractor unit. The outer end of the block 286 defines an inclined face 310 which is engaged by the locking mechanism associated with the fifth wheel (such as that indicated at 76 in FIG. 4). The shaping of face 310 is such that the block is positively and firmly locked into the slot in the fifth wheel.

Figures 14, 15, 16:
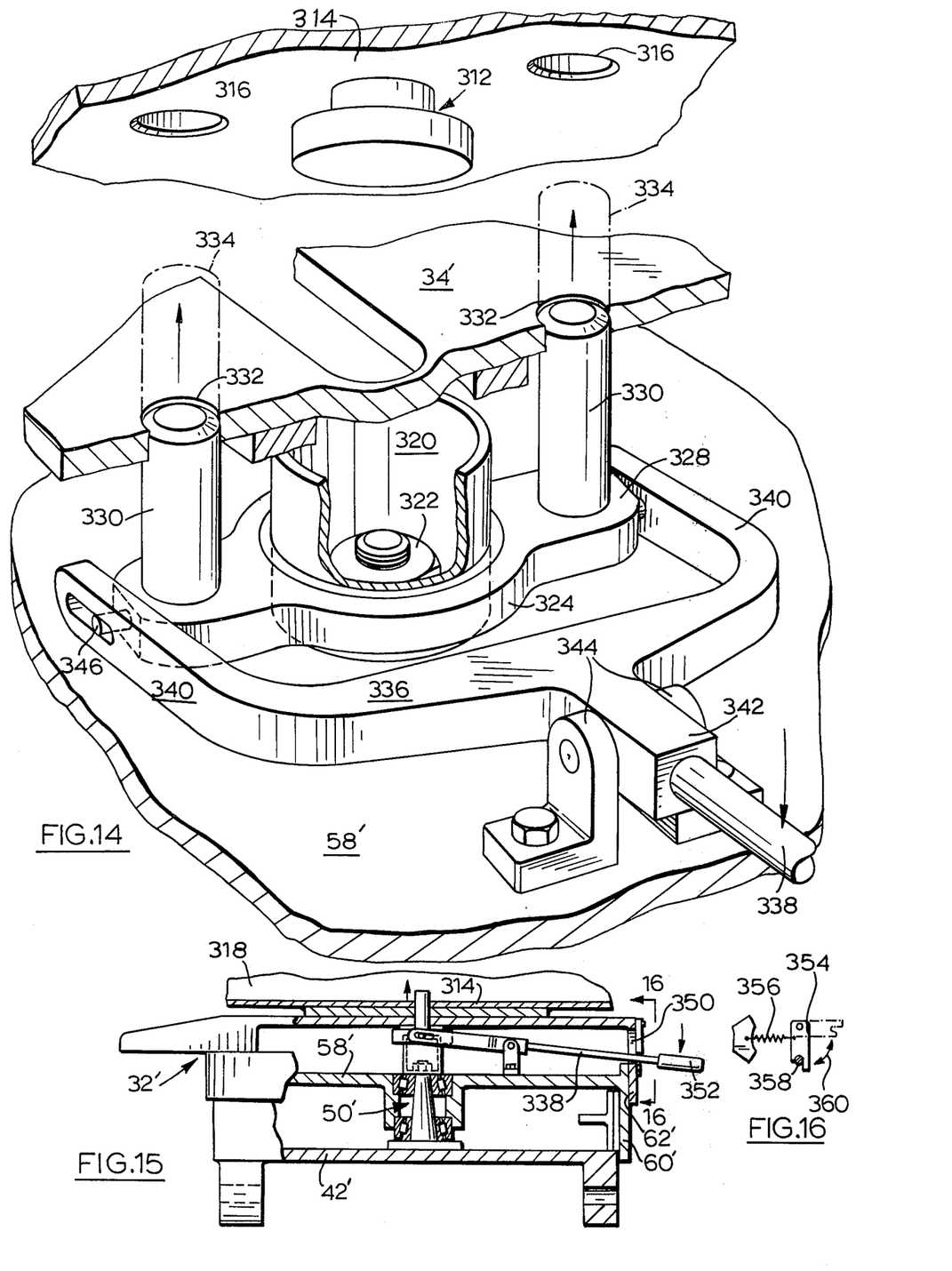
FIG. 14 is a perspective view, partly broken away, of a fifth wheel assembly according to a further feature of the invention.
FIG. 15 is a partly sectioned side view corresponding to FIG. 14.
FIG. 16 is a detailed sectional view on line 16—16 of FIG. 15.

FIGS. 14 to 16 illustrate a modified fifth wheel assembly which includes a device for locking a trailer coupled to the assembly against turning with respect to the fifth wheel. This allows a standard trailer having a round coupling pin to be operatively coupled to the anti-jackknife apparatus. The embodiment of FIGS. 14 to 16 will be described as a modification of the embodiment of FIGS. 1 to 6 although it is to be clearly understood that the locking device of FIGS. 14 to 16 is applicable to any embodiment of the invention in which a flat-sided coupling pin would otherwise be required.

For convenience of description, primed reference numerals have been used in FIGS. 14 to 16 to denote parts which correspond with parts in FIGS. 1 to 6.

In FIGS. 14 and 15 the part circular portion of the fifth wheel 32' of the anti-jackknife apparatus is visible at 34'. This portion is formed with a parallel sided slot 38' to receive a coupling pin 312 which depends from a plate 314 secured to the underside of the leading end portion of a trailer to be coupled to the anti-jackknife apparatus. Plate 314 and pin 312 are conventional fixtures on a standard trailer. Plate 314 differs from a standard plate only in that it is provided with two apertures 316, the purpose of which will be described later. In FIG. 15, plate 314 is visible below part of the trailer body indicated at 318.

The part-circular portion 34' of the fifth wheel has a depending skirt 62' which is coupled by bolts to the upper margin of a cylindrical member 60' surrounding a plate 58'. Plate 58' together with a cylindrical member 60' are turnably mounted on a tapered shaft 50' attached to a base plate 42' which is in turn pivotally coupled to the frame of the tractor unit.

In the space between the part-circular portion 34' of the fifth wheel and the circular plate 58' is a cupshaped member 320 having a cylindrical outer surface. Member 320 has a central aperture which receives the upper end of shaft 50'. This end of the shaft is screw-threaded and the cup member is retained by a nut 322 on the shaft. It will be appreciated that the inner end of slot 38' is of semi-circular shape and is centered on a vertical axis co-incident with the common vertical axis of shaft 50' and cup member 320. It will be noted that the upper end of member 320 is spaced below the underside of the portion 34' of the fifth wheel to allow clearance for the head of the coupling pin 312.

Cup member 320 acts as a guide for a vertically slidable collar 324 which has integral lateral projections 328 carrying vertical locking pins 330. These pins can be projected upwardly through corresponding apertures 332 in the part circular portion 34' of the fifth wheel to engage in the respective apertures 316 in the coupling pin plate 314 on the trailer and thereby lock the trailer and the fifth wheel of the anti-jackknife apparatus against relative turning movement. In FIG. 14, the locking pins 330 are shown in retracted positions in which their upper ends are substantially flush with the upper surface of the part circular portion 34' of the fifth wheel. The pins are movable between these positions and elevated locking positions indicated in chain line at 334 in which they engage in the apertures 316 in the trailer coupling plate 314 (assuming the trailer is coupled to the fifth wheel). It will of course be appreciated that in FIG. 14, the trailer coupling pin 312 and plate 314 are shown in exploded positions for clarity of illustration and that plate 314 will be in contact with the upper surface of the part circular portion 34' when the trailer is engaged with the fifth wheel.

Movement of the locking pins 330 between their retracted and elevated positions is effected by a fork member 336 operable by a control arm 338. Member 336 has side limbs 340 coupled to the projections 328 of collar 324, and a central limb 342 pivotally mounted between two lugs 344 on the circular plate 58'. The limbs 340 of member 336 are coupled to the projections 328 of collar 324 by laterally projecting pins 346 (only one of which is visible) on the projections 328 of collar 324, which pins are received in slots 348 in the limbs. The control arm 338 projects to the rear of the fifth wheel through a vertical slot 350 in skirt 62' (see FIG. 15) and has a handle 352 at its outer end. It will be appreciated that downward movement of the outer end of the arm 338 from the position in which it is shown in FIG. 14 will cause collar 324 to lift the locking pins 330 to the elevated positions in which they are shown in FIG. 15 (in which only one pin is visible) and in which they are indicated at 334 in FIG. 14.

Arm 338 is manually operable and is arranged to be locked in its down position (with the pins 330 raised) by means of a pivoted latch 354 (see particularly FIG. 16). Latch 354 is biassed by a spring 356 into the upright position in which it is shown in FIG. 16 and is formed with a notch 358 in which the arm 338 engages. Latch 354 is deflectable in the direction of arrow 360 in FIG. 16 against its spring biassing to allow the arm 338 to return to its upper position and allow the pins 330 to retract under their own weight.

It will be appreciated that the locking arrangement described above allows a tractor unit fitted with an anti-jackknife apparatus according to the invention to be coupled with a conventional trailer with minimum modification of the trailer. It is simply necessary for the apertures 316 to be formed in plate 314. This can be readily effected with the plate 314 in place on the trailer, for example, using a conventional cutting torch.

The preceding description applies to specific embodiments of the invention only and it is of course to be understood that many variations are possible within the broad scope of the invention. For example, the description refers to several specific types of braking means, but is not to be considered as exhaustive. Further, although the brake actuators referred to in connection with the preceding embodiments have been described as pneumatically operated, hydraulically or electrically operated actuators may be used with appropriate changes in their control. It is also to be understood that the two slot form of fifth wheel shown in FIG. 7 could be used in the other embodiments in place of the single-slot fifth wheels shown. Also, the control system described with reference to FIG. 6 may be used in any of the embodiments which employ a hydraulically or pneumatically operated braking system.

It should finally be noted that the term "tractor-trailer" as used in this application is intended to be construed broadly as including any articulated vehicle. For example, the invention could be used in articulated recreational vehicles. Also, the expression "tractor unit" is to be interpreted as including any units from which a trailer is towed. For example, in the trucking field, an anti-jackknife apparatus according to the invention could be used in association with a so-called "pup" trailer; that is, an auxiliary trailer which is towed behind another trailer. A wheeled sub-assembly or bogey (often referred to as a "Joe Boy") is conventionally positioned below the leading end of the pup trailer and is attached to the towing trailer by a rigid tow coupling. The bogey carries a fifth wheel to which the pup trailer is coupled by a coupling pin. An anti-jackknife apparatus according to the invention could be provided in association with the fifth wheel of the bogey. Accordingly, in the case of a tractor unit towing a first trailer and also a pup trailer, two fifth wheels are employed. Each of them may be provided with an anti-jackknife apparatus according to the invention.

What I claim is:

1. A tractor unit having an anti-jackknife apparatus and including:
   a fifth wheel formed with a slot to receive a coupling pin on a trailer to be coupled to the tractor unit;
   bearing means disposed between the fifth wheel and the tractor unit and adapted to permit the fifth wheel to turn with respect to the tractor unit about an upright axis;
   means for preventing a trailer coupled to the tractor unit from turning with respect to the fifth wheel, the trailer and fifth wheel turning together about said axis when the tractor unit is coupled to a trailer and is negotiating a turn in use;
   braking means associated with the fifth wheel and including at least one fluid pressure operated actuator adapted to be coupled to a source of fluid pressure independent of the normal road wheel braking circuit of the tractor unit, said braking means being arranged, when operated, to restrict turning of the fifth wheel about said axis and thereby to arrest or prevent uncontrolled swinging of the trailer with respect to the tractor unit; and,
   control means for said braking means, said control means including:
      a first variable pressure valve which has an input connected directly to said source of fluid pressure, and an output, and which is operable manually under the control of a driver of said tractor unit in use to vary the fluid pressure at said output of the valve;
      a second variable pressure valve disposed in parallel with said first variable pressure valve and having an input connected directly to said source of fluid pressure, and an output, and which is coupled to a foot brake of the tractor unit so that the valve is operated in response to operation of the foot brake to vary the fluid pressure at said output of the valve; and,
      a selector valve which has an output coupled to said actuator of the braking means, first and second inputs coupled respectively to the outputs of said first and second variable pressure valve, and a valve member which is movable between a first position in which the first input of the selector valve is coupled to said output so that the braking means are controlled exclusively by said first variable pressure valve under the control of a driver of the tractor unit, and a second position in which said second input of the selector valve is coupled to said output and said braking means is operated exclusively by said second variable pressure valve under the control of the foot brake of the tractor unit.

2. A tractor unit as claimed in claim 1, further comprising a brake drum associated with said fifth wheel so as to turn with the fifth wheel in use, wherein the braking means are adapted to frictionally engage a curved surface of the said brake drum to restrict turning of the fifth wheel in use.

3. A tractor unit as claimed in claim 2, wherein the brake drum is mounted below the fifth wheel and is disposed co-axially with respect to the said axis of turning of the fifth wheel, and wherein the apparatus further includes a base plate mounted on the tractor unit and adapted to support the brake drum and hence the fifth wheel, the said bearing means being mounted on the base plate and being coupled to the brake drum, and the said braking means being carried by the base plate for action on the brake drum.

4. A tractor unit as claimed in claim 3, wherein the said braking means comprises an expanding shoe braking mechanism disposed on the said base plate inside the brake drum and including at least one shoe positioned to act on the inner curved surface of the brake drum, whereby movement of the said shoe into engagement with the said surface of the drum applies a braking force to the fifth wheel.

5. A tractor unit having an anti-jackknife apparatus and including a fifth wheel formed with a slot to receive a coupling pin on a trailer to be coupled to the tractor unit, wherein said anti-jackknife apparatus comprises:

bearing means disposed between the fifth wheel and the tractor unit and adapted to permit the fifth wheel to turn with respect to the tractor unit about an upright axis;

means for locking a trailer coupled to the fifth wheel against turning movement with respect to said fifth wheel, said locking means being disposed below the fifth wheel and comprising:

at least one locking pin arranged adjacent said slot in the fifth wheel, the fifth wheel being apertured at the position of the pin and the pin being movable between an inoperative position in which it is retracted below the surface of the fifth wheel, and an operative position in which the pin projects above such surface for engagement in a complimentary aperture in the underside of a trailer coupled to the fifth wheel in use; means for moving the locking pin between said operative and inoperative positions; and means for retaining the locking pin in said operative position to lock a trailer coupled to the fifth wheel against turning movement with respect to the latter, whereby the trailer and the fifth wheel turn together about said axis when the tractor unit is coupled to a trailer and is negotiating a turn in use;

in association with the fifth wheel, braking means including at least one actuator adapted to be coupled to a source of fluid pressure, said braking means being adapted, when operated, to restrict turning of the fifth wheel about said axis and thereby arrest or prevent uncontrolled swinging of the trailer with respect to the tractor unit; and, control means for varying the pressure of said fluid, said control means including a first variable pressure valve which is operable manually under the control of the driver; a second variable pressure valve which is coupled to the foot-brake of the tractor unit and which is operated in response to operation of the foot-brake; and a selector valve which is coupled to said variable pressure valves and which is adapted to be operated to select which of said variable pressure valves controls said actuator.

* * * * *